United States Patent [19]

Bemis et al.

[11] Patent Number: 5,028,056
[45] Date of Patent: Jul. 2, 1991

[54] FIBER COMPOSITE SEALING ELEMENT

[75] Inventors: Steve Bemis, Houston; Erwin E. Stocker, Cypress, both of Tex.

[73] Assignee: The Gates Rubber Company, Denver, Colo.

[21] Appl. No.: 934,074

[22] Filed: Nov. 24, 1986

[51] Int. Cl.⁵ .............. F16J 15/56; F16J 15/00; F16L 55/11
[52] U.S. Cl. .............................. 277/227; 138/89; 138/DIG. 2; 277/DIG. 6
[58] Field of Search .............. 277/227, 230, DIG. 6; 138/DIG. 2, 89, 96 R; 215/363, 364

[56] References Cited

U.S. PATENT DOCUMENTS

| Re. 23,317 | 1/1951 | Greenwald | 138/DIG. 2 |
|---|---|---|---|
| 2,644,978 | 7/1953 | Becker | 138/89 X |
| 2,747,616 | 5/1956 | DeGanahl | 138/DIG. 2 |
| 2,943,009 | 6/1960 | Mirsky et al. | 138/DIG. 2 |
| 3,077,904 | 2/1963 | Rusche | 138/89 |
| 3,287,920 | 11/1966 | Oitto, Jr. | 138/89 X |
| 3,448,772 | 6/1969 | Delamater | 138/89 |
| 3,551,273 | 12/1970 | McKinney | 215/363 X |
| 3,578,027 | 5/1971 | Zopi | 138/89 |
| 3,675,685 | 7/1972 | Potter | 138/89 |
| 3,691,000 | 9/1972 | Kalnin | 138/DIG. 2 |
| 3,719,366 | 3/1973 | Pippert | 277/230 X |
| 3,800,486 | 4/1974 | Harvey | 138/96 R |
| 3,879,044 | 4/1975 | Estes | 277/DIG. 6 |
| 3,901,517 | 8/1975 | Heathcott | 277/227 |
| 4,214,761 | 7/1980 | Pippert | 277/230 X |
| 4,280,709 | 7/1981 | Heikes, Jr. et al. | 277/229 |

FOREIGN PATENT DOCUMENTS

| 349460 | 6/1937 | Italy | 215/364 |
|---|---|---|---|
| 168414 | 6/1934 | Switzerland | 215/364 |
| 233412 | 5/1925 | United Kingdom | 215/364 |

OTHER PUBLICATIONS

"Slush Pump Expendables-Performance and Economics", by J. R. (Bob) Arnett (of Reed American Products Co.) in 1981 Drilling Technology Conference Transactions.

Primary Examiner—Allan N. Shoap
Attorney, Agent, or Firm—C. H. Castleman, Jr.; H. W. Oberg, Jr.; J. L. Isaac

[57] ABSTRACT

The composite sealing element of the invention includes an elastomeric sealing lip portion and a base portion, chemically bonded to the sealing lip comprised of an elastomer reinforced with discrete dispersed fibers oriented in a preferential manner, and the sealing lip and base portions being chemically bonded together such as by covulcanization to form an integral sealing element resistant to delamination. The method involved forming a fiber loaded sheet in which the fibers are oriented generally unidirectionally, plying up the sheet to form the base portion of the sealing element, and molding the finished article under heat and pressure.

15 Claims, 2 Drawing Sheets

FIBER COMPOSITE SEALING ELEMENT

BACKGROUND OF THE INVENTION

This invention relates to sealing elements and particularly to a cylindrical sealing element having an annular sealing lip formed of resilient material, bonded to a reinforced base portion also formed partially of resilient material, and a method for its production.

An example of a sealing element in accordance with the invention earmarked for dynamic applications is a piston rubber or packing, as used, for instance, in oil or water-based fluid pumps. For instance, piston rubbers are used in reciprocating, usually double acting, slurry-type pumps in the oil industry for pumping mud during drilling operations. In this application, two piston rubbers are used in a cylindrical liner in assembly with the normal piston hub and retainer and locking rings. A piston rubber has a generally cylindrically shaped elastomeric body with a lip seal bonded to a reinforced base or heel. Pairs of piston rubbers are arranged back-to-back with their reinforced ends abutting the piston hub with the lip seals facing away from one another and sealingly engaging the liner bore.

An example of a sealing element used in static applications is the stopple sealing element used to temporarily seal off a pipeline for plugging or bypass operations. The section of line is isolated by lowering the stopple sealing element through a special fitting and then rotating the sealing element, which is attached to a steel plate, so that a seal is attained and flow in the pipeline may be temporarily stopped. The stopple sealing element has a sealing lip similar to the piston rubber, and is attached to a reinforced cylindrical base portion to which the steel plate is typically attached with fastening members.

The standard reinforced piston rubber and stopple sealing element base portion are formed of a multi-layered fabric reinforcement made by stacking a number, e.g., 5-30, of annular rings (in the case of the piston rubber) or disks (in the case of the stopple) which are individually died out in "cookie-cutter" fashion from flat, square-woven fabric impregnated with elastomer. Cut threads of the square-woven fabric are exposed along a circumferential portion of the heel or base portion of the sealing element to define a wear-resistant surface. Another type of piston rubber reinforcement is fabricated by spiralling a flat strip of square-woven fabric to cause the threads of the fabric to slip and change angles relative to each other as the flat strip of fabric is helically applied to form an annulus. This piston rubber construction and method are disclosed in U.S. Pat. No. 3,719,366 to Pippert. Like the cookie cutter method, cut ends of the helically spiraled fabric are exposed at a circumferential portion of the piston rubber.

Another type of piston rubber construction is disclosed in U.S. Pat. No. 4,280,709 to Heikes et al. In that patent, the reinforcement is made by wrapping a square-woven textile fabric in volute fashion to form a roll. The roll is square cut to form a plurality of bands or rings of desired width. The band is positioned during manufacture of the piston rubber so that threads of the fabric have side portions exposed along a circumferential end portion of the piston rubber to define a wear-resistant surface. The method of manufacture substantially reduces fabric scrap (in contrast to the waste produced by the cookie cutter method), simplifies fabrication and also yields a piston rubber construction having improved wear-resistance. Despite these advantages there has been a tendency for the helically rolled fabric to come unraveled in use because or poor bonding at the distal seam.

For sealing elements of the aforementioned type, failures have largely occurred in the base or heel area of the molded elastomeric elements. Attempts have been made to overcome these problems by utilizing different fabric orientations (as in the Heikes et al. patent), or use of higher modulus materials for the base section such as steel or polyurethane, for instance. Some sealing elements have even been made exclusively of elastomer without any reinforcing members. While some of these alternate constructions have proved comparable in performance to the standard plied up cookie cutter construction, none appear to offer significantly longer service life which has been a goal in the industry.

A thorough examination of piston rubber wear and failure was presented by J. R. Arnett in "Slush Pump Expendables, Performance and Economics," 1981 *Drilling Conference Transactions.* International Association of Drilling Contractors, 1981, pp. 269-277. Arnett found in both theoretical examination and failure analysis that the predominant factors in noncatastrophic piston rubber failures was abrasion and, to a lesser extent, erosion and adhesion. Catastrophic failures of properly manufactured piston rubbers were found to be mainly due to delamination in the heel section and at the transition between heel and seal areas. The paper found that no present combination of materials and design economically improved the life over the conventional design.

It is an object of this invention to provide a sealing element having a reduced tendency of the sealing lip and reinforced base portions to delaminate.

It is another object to produce a sealing element with an integrated structure having a greater elastomer-to-elastomer chemical bonding surface and a reduced volume and density of the reinforcement material within the sealing element compared to prior reinforced constructions.

It is another object to provide a simplified method of construction of the sealing element characterized by reduced scrap produced during manufacture.

It is still another object to provide a sealing element of improved performance and life through enhanced wear and stress fatigue resistance.

SUMMARY OF THE INVENTION

The invention is based in part on the discovery that the aforementioned objects can be realized by forming the base portion of the sealing element with elastomer reinforced with discrete fibers which are oriented so that the lines of wear forces in use of the sealing element are perpendicular to the fibers.

In one aspect, the sealing element of the invention is briefly described as a cylindrical body defined by an axis and having a sealing portion and a reinforced base portion. The sealing portion comprises an annular sealing lip formed of resilient material of relatively low stiffness. The reinforced base portion is chemically bonded to the sealing portion and comprises a resilient material in which is embedded discrete reinforcing fibers interspersed through the resilient material to form a composite. A substantial portion of the fibers are oriented substantially in the same direction. The fiber reinforced composite has a relatively high stiffness compared to the sealing lip.

In another aspect, the sealing element of the invention further provides for the oriented fibers to lie substantially concentrically with respect to the axis of the cylindrical body, with a portion of such concentrically oriented fibers being positioned substantially at the outside diameter of the cylindrical body and extending circumferentially thereof.

In another aspect, the invention contemplates a method for producing a sealing element of the aforementioned type, including the steps of: (a) forming a stock comprising an uncured elastomer and discrete reinforcing fibers into a composite sheet in which the fibers are substantially aligned unidirectionally in the sheet; (b) plying up such sheet into a multi-layered sandwich with the fibers of the sheet oriented in a predetermined manner; (c) forming a separate mass of uncured elastomeric material; (d) positioning the multi-layered sandwich and mass of uncured elastomeric material in a mold cavity of desired shape; and (e) pressurizing and heating the multi-layered sandwich and mass of elastomer together in the mold to cure the same into an integral chemically bonded sealing element in which the cured multi-layered sandwich with oriented fibers serves as the reinforced base portion, and the cured elastomer mass serves as the sealing portion.

BRIEF DESCRIPTION OF THE DRAWINGS

The invention will be described in part by reference to the accompanying drawings, in which like numerals designate like parts, and in which.

PREFERRED EMBODIMENTS OF THE INVENTION

Figure 1:
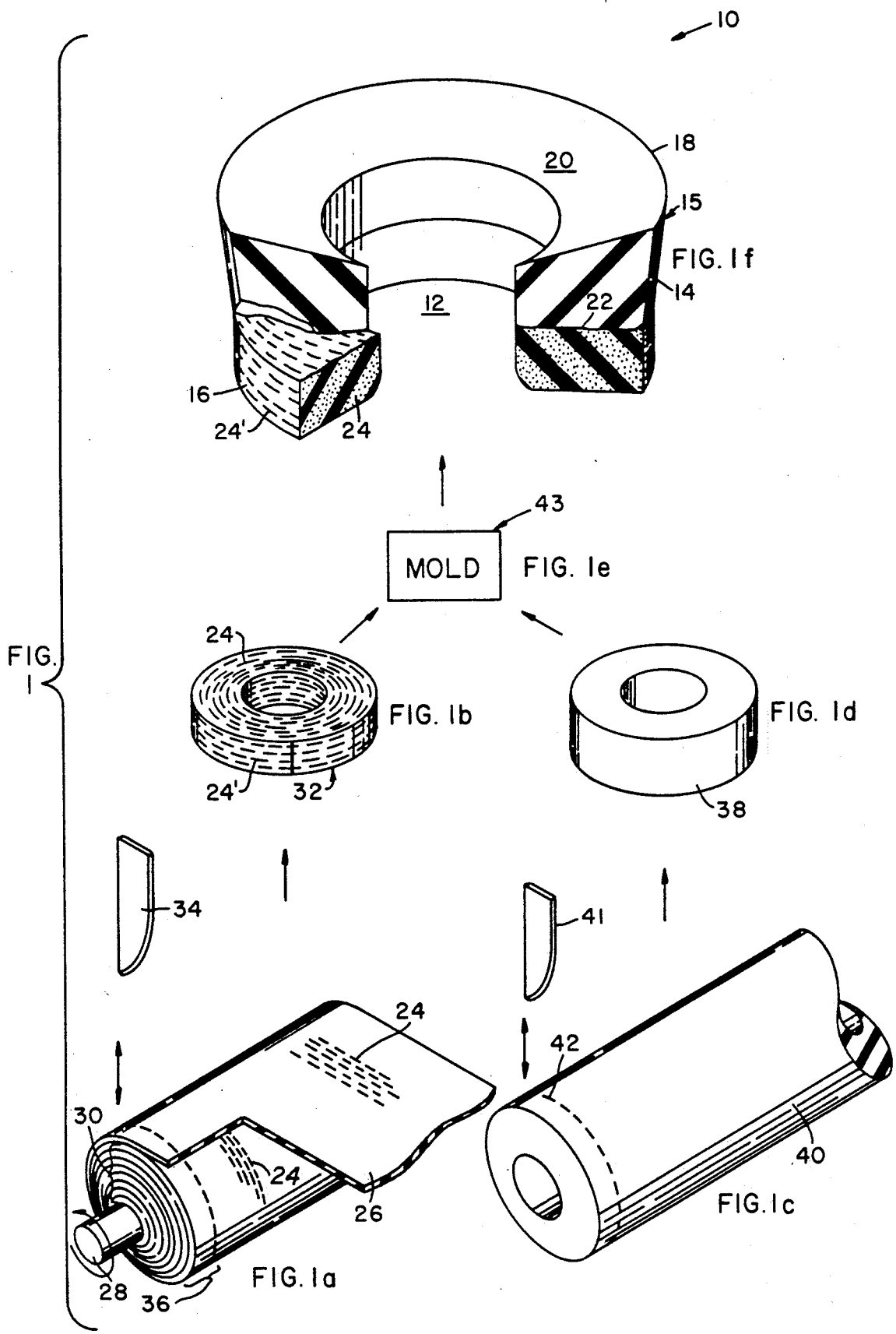
FIG. 1 depicts in perspective a piston rubber sealing element, partially broken away, constructed in accordance with the invention (FIG. 1f), together with the individual components employed to form the construction of FIG. 1f (shown in FIGS. 1a, 1b, 1c, 1d and 1e)

The invention applies to various sealing elements useful in both dynamic and static applications having a generally cylindrical body with a sealing portion bonded to a reinforced base.

A piston rubber constructed in accordance with the invention is shown generally at 10 in FIG. 1e and has a generally cylindrical body with a central bore 12 for mounting the piston rubber on an associated hub member (not shown). The piston rubber body 15 is composed of sealing portion 14 bonded to a reinforced heel or base portion 16. Sealing portion 14 has a lip type seal at 18 formed by the somewhat outwardly inclined outer wall of the sealing portion 14 and the inclined upper surface 20 which forms an acute angle with the outer wall terminating at lip 18. In use, fluid pressure acting against the inclined surface 20 will force lip 18 radially outwardly against the liner of the pump to maintain a fluid tight seal.

The sealing portion 14 is formed of any suitable elastomer having resilient properties and typically will be selected from natural or synthetic rubbers or blends thereof. Examples of useful synthetic rubbers include nitrile, neoprene and fluoroelastomers such as Viton (registered trademark), the selection of which will depend upon the application and required resistance to oils, chemicals or heat encountered in use, for instance. The sealing lip normally is compounded to have a relatively low stiffness in comparison to the base portion 16, and hardness (durometer) chosen to allow sealing lip 18 to sealingly engage the liner under normal conditions of use. Typical additives which may form part of the elastomeric compound include reinforcing agents (e.g., carbon black), curatives (e.g., sulfur), fillers, thermoplastics, accelerators, and the like.

In accordance with the invention, base portion 16 comprises a resilient material compatible and preferably substantially identical with the resilient material employed in the sealing portion 14, in which is embedded discrete reinforcing fibers 24 which are interspersed, preferably uniformly, throughout the resilient material of the base. A fiber loaded composite is formed, the fibers having a sufficiently high modulus to impart required stiffness to the composite and prevent extrusion or flow by as is normally required for piston rubbers. Unlike the conventional base or heel portions which are reinforced with died-out layers of fabric in which the fabric occupies a large percentage of the volume of the heel, the reinforcing fibers of the composite heel 16 of the invention occupy a relatively low percentage of the heels volume, thereby ensuring that more of the elastomer is available to make direct chemical bonds with the corresponding elastomer of the sealing portion 14 at their mutual interface 22. For instance, when employing the preferred glass fibers 24 as the fibrous reinforcing members in heel 16, preferably the loading level of the fibers is from about 10 to about 20 weight percent of the material of heel 16, with the remainder being substantially the compounded elastomer. With fiber loadings exceeding the 20 percent level, there appears to be degradation in the physical properties of the heel composite, and bonding at interface 22 to the adjoining sealing portion 14 is compromised. On the other hand, fiber loading levels of below 10 percent do not impart sufficient stiffness to the heel to meet operational requirements.

Although not narrowly critical, preferably the reinforcing fibers have a length from about 0.125 to about 0.500, more preferably from about 0.1875 to about 0.375 inches, and an aspect ratio ranging from about 10 to about 1.

A substantial portion and preferably the large bulk of the fibers 24 are oriented in the composite substantially in the same direction. It is important to the invention not only that the fibers be oriented generally unidirectionally, but also that the fibers be oriented generally perpendicular to the direction of force supplied during use of the sealing element. As can be seen from FIG. 1f, the oriented fibers 24 lie substantially concentrically with respect to the axis of the cylindrical body 15, and a portion 24' of such concentrically oriented fibers are positioned substantially at the outside diameter of the cylindrical body 15 and extend circumferentially thereof. In respect to piston rubbers, this circumferential orientation substantially at the surface at the outer diameter of the heel section 16 is regarded as critical to counteract the normal wear patterns seen in standard fabric reinforced piston rubbers. Normally, heel failure results from both wear and compression stress fatigue. The wear is evidenced primarily by the development of axial grooves at the outer circumference of the heel section, caused primarily by erosion and abrasion in use. As the fibers in accordance with the invention are oriented generally circumferentially at such outer diameter surface so that most, but not all, of these fibers lie concentrically with the outside diameter of the heel, strength is imparted in all directions. The lines of wear forces are perpendicular to the fibers and the positioning of the fibers circumferentially at the outer diameter of the heel provides the optimal resistance to wear by using the length of the fiber as a wear surface.

Heel section 16 is also subjected to rapidly repeated cycles of compression and release. This eventually causes fatigue in the mechanical bonds of the standard fabric-reinforced piston rubber. The pumped fluid, under high pressure, does further damage to these bonds until failure results. While the fibers of the composite heel of the invention are also held by mechanical bonds, the much lower density of fiber in the composite and discreteness of the fibers compared to the continuous nature of the previously used fabric reinforcement creates a situation where chemical bonds are dominant in the composite. In other words, the ratio of chemical to mechanical bonds has been increased substantially over standard piston rubber heel constructions, with the result that compression stress fatigue problems are substantially reduced.

It is also noted that by orienting fibers 24 in the manner shown in FIG. 1f, a uniform stiffness is imparted to heel section 16 so that resistance to bending about any axis perpendicular to the axis of cylindrical body 15 is uniformly the same, which is important in service use of the piston rubber.

A method of producing a sealing element and particularly the piston rubber of the invention is shown in FIGS. 1a–1e of FIG. 1. To achieve the desired fiber orientation, the heel subassembly is formed as shown in FIGS. 1a and 1b. First, an uncured relatively thin sheet 26 of composite stock is formed by passing a compounded elastomeric stock loaded with glass or other high modulus imparting fibers 24 through a pair of calender rolls (not shown). The result of this calendering operation is to orient fibers 24 longitudinally in respect to the direction of sheet produced by the calender (i.e., generally perpendicular to the plane formed by the axes of the calender rolls). Typically the thickness of the composite sheet 26 may be around 0.060 inches, with the thickness preferably ranging from about 0.030 to about 0.200 inches.

Calendered sheet 26 with fibers 24 oriented as shown in FIG. 1a are then rolled up on mandrel 28 as shown. Normally, the diameter of mandrel 28 would correspond substantially to the inside diameter 12 desired for the piston rubber, and the annular thickness 30 of the rolled up stock would correspond substantially to the annular thickness of the heel section desired in the finished product. As illustrated, after sheet 26 has been rolled onto mandrel 28 to the desired depth 30, the roll may be severed into individual uncured rolls 32 shown in FIG. 1b using knife 34. The width 36 of each of the bands 32 will be selected to conform substantially to the axial height of the heel section 16 of the finished piston rubber. As seen in FIG. 1b, the result of this rolling process is to orient fibers 34 concentrically in respect to the axis of the band with a portion 24' of the fibers positioned substantially at the outer diameter of the band.

The uncured sealing portion component 38 used to form the sealing portion 14 of the piston rubber may be formed in any desired manner, such as by extrusion of a continuous length of uncured elastomer into tube 40 as shown at FIG. 1c, followed by knife-cutting at incremental locations 42 with knife 41 or other means to produce individual cylindrical elements 38 shown in FIG. 1d.

The composite band 32 of FIG. 1b is then joined with cylindrical segment 38, one superimposed on the other, and then molded together at 43 in a mold cavity (not shown) at suitable pressure and temperature to cause the composite band 32 and elastomer mass 38 to cure and join together to form the integrated structure shown at 10 in FIG. 1f. Typically, the vulcanization process will cause the respective elastomers in each of the sealing and heel portions to chemically bond at interface 22 and form an integral structure. Typically, the molding pressure employed may vary from about 400 to about 1800 psig, and the molding temperature may vary from about 280 to about 340 degrees F. Although compression molding is contemplated as a preferred process, the sealing portion of a piston rubber alternatively may be formed by transfer molding, injection molding, or the like.

Figure 2:
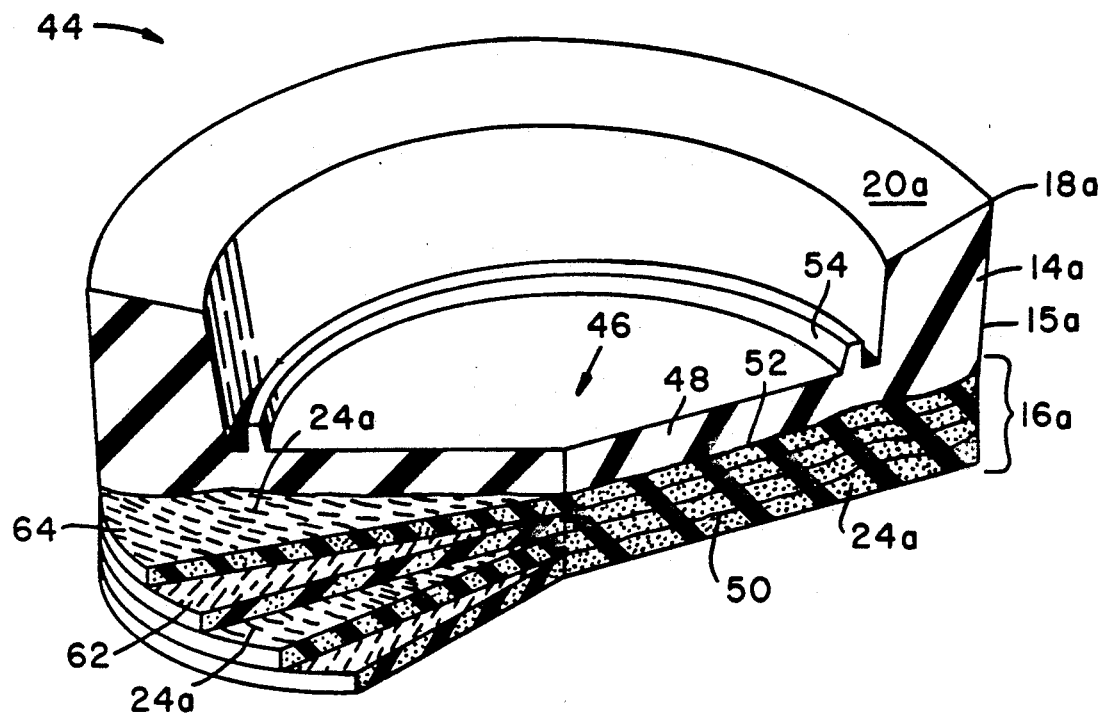
FIG. 2 is a perspective, partial cut-away view of a stopple sealing element made in accordance with the invention.

An alternative embodiment of the invention, the stopple sealing element, is shown in FIG. 2. As with the piston rubber, the stopple sealing element is also formed of a generally cylindrical body with a sealing portion 14a bonded to a base portion 16a. Sealing portion 14a is formed with a sealing lip defined by the outer wall of sealing portion 14a and inclined upper surface 20a which mutually form an acute angle with respect to one another and terminate in sealing lip 18a. Unlike the piston rubber, the stopple sealing element 44 has no axial opening, but rather includes a continuous generally planar central portion 46 composed of extended sealing portion 48 and extended central base portion 50, joined at interface 52 largely through chemical bonding similar to the piston rubber embodiment. A lip 54 is also provided in the sealing portion which, together with central portion 46 accommodates a locating device (shown at 56 in FIG. 3). In assembly the locating device is bolted at a plurality of locations at 58 to a metal plate member 60, which will be discussed hereafter.

Base section 16a of the stopple sealing element is preferably formed of a plurality of layers 62, 64 of composite stock in accordance with the invention. Each layer of composite stock is formed of a resilient material (e.g., compounded natural or synthetic rubbers) in which is embedded discrete reinforcing fibers 24a which are interspersed generally uniformly through the resilient material and are oriented substantially in the same direction. As with the piston rubber, the reinforcing fibers impart stiffness to the base portion 16a. To produce a uniform bending modulus for such base section 16a, it is highly preferred to orient the fibers 24a alternately in adjoining layers 62, 64 at a predetermined angle in respect to one another, e.g., at 90 degrees as shown in layers 62, 64, with an even number of such layers, so that a uniform stiffness and bending modulus is produced. If numerous composite layers are used to make up base section 16a, clearly the relative angle of orientation of fibers in adjoining layers may be varied to achieve the same desired uniform stiffness.

A preferred method of producing the stopple sealing element of FIG. 2 is to form sheets of composite elastomeric stock by calendering, as aforementioned, to impart a general unidirectional orientation of the fibers in the sheet. The sheet is then cut into individual discs corresponding to the diameter of the stopple sealing element, with the direction of orientation of the fibers noted on each disc. The discs are then superimposed on one another with successive discs rotated appropriately to achieve the desired differential relative degree of orientation (preferably from about 30° to about 90°) between fibers in adjacent layers. After the uncured set of layers of composite stock are superimposed to correspond to the base section, this composite sandwich may then be placed in a mold together with a mass of elastomer of appropriate size and shape serving as sealing portion 14a of the stopple sealing element. The sealing and base portions may then be compression molded in a mold cavity of suitable shape, at a desired pressure and temperature to achieve curing (vulcanizaton) and an integrated joining of the two sections with chemical bonding at interface 52 to produce a unitary, integral article 44.

As with the piston rubber, the fibers in base 16a of the stopple sealing element are oriented perpendicularly to the axis of the element and hence perpendicular to the direction of force of the fluid which will be present in a conduit in which the stopple sealing element is positioned.

Figure 3:
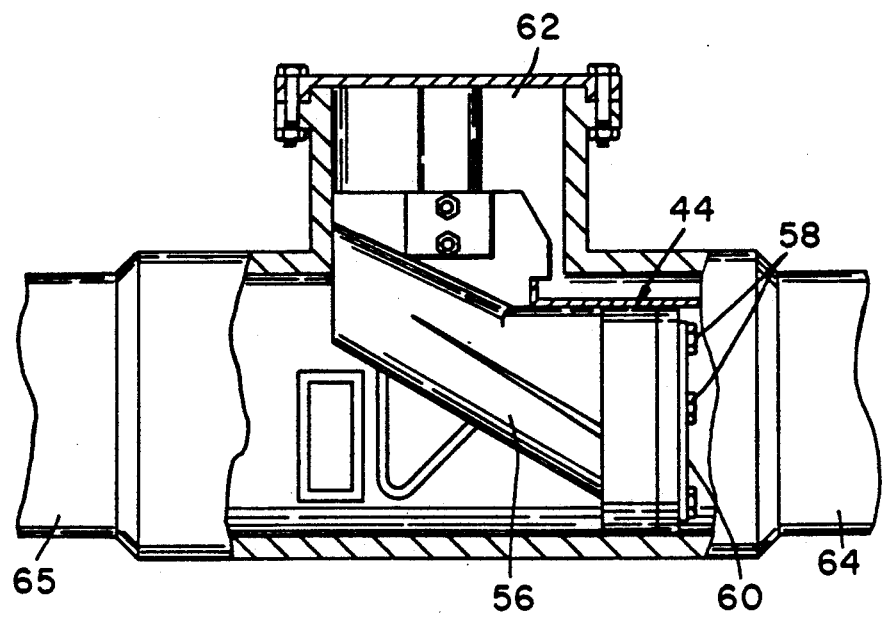
FIG. 3 is a cut-away view of an assembly of a pipeline with a fitting showing the positioning of the stopple element of FIG. 2 sealingly engaging the pipeline opening to temporarily stop flow within the pipeline or divert the flow through the fitting to a bypass line (not shown).

An example of a stopple sealing element mounted in a conduit to isolate fluid flow is shown in FIG. 3. Stopple element 44 is held in position by a retaining fixture 56 mounted to stopple element 44 with the aid of base plate 60 positioned against the back side of base 16a. The base plate is fastened to the element with the aid of bolt and nut fastening members 58 which penetrate the central portion 46 of the element. In the installation operation, stopple element 44 and the attaching fixture may be lowered into the line through an opening in special valve member 62 attached to the line for this purpose, and rotated into position. In this fashion, portion 64 of the conduit or pipeline will be plugged off as the fluid pressure from segment 65 of the pipeline will cause sealing lip 18a of the stopple element to press against and make a seal against the inner diameter of the pipe, and fixture 56 in plate 60 will hold the stopple element rigidly in the position shown in the pipeline. If desired, the fluid from line 65 may then be routed through a bypass line (not shown) to temporarily bypass the affected portion 64 of the line and reenter through a bypass valve similarly plugged off at one side by another suitable stopple sealing element 44.

While certain representative embodiments and details have been shown for the purposes of illustrating the invention, it will be apparent to those skilled in this art that various changes and modifications may be made therein without departing from the spirit or scope of the invention.

What is claimed is:

1. A sealing element comprising:
   a cylindrical body defined by an axis and having a sealing portion and a reinforced base portion;
   said sealing portion comprising an annular sealing lip formed of resilient material of relatively low stiffness;
   said reinforced base portion being chemically bonded to the sealing portion and formed predominantly of a resilient material in which is embedded discrete reinforcing fibers interspersed through the resilient material to form a composite, a substantial portion of the fibers being oriented substantially in the same direction, the orientation being generally perpendicular to the axis of the element, the composite having a relatively high stiffness compared to the sealing lip.

2. The sealing element of claim 1 wherein the oriented fibers lie substantially concentrically with respect to the axis of the cylindrical body, and a portion of such concentrically oriented fibers are positioned substantially at the outside diameter of the cylindrical body and extend circumferentially thereof.

3. The sealing element of claim 1 in the form of a piston rubber, having a central bore therethrough for receipt of a piston hub.

4. The sealing element of claim 1 in the form of a generally cup-shaped stopple for isolating and cutting off the flow of material within a conduit, in which the annular sealing lip protrudes generally perpendicularly from the base portion.

5. The sealing element of claim 1 wherein the discrete reinforcing fibers are glass fibers.

6. The sealing element of claim 5 wherein the glass fibers are present in an amount from about 10 to about 20 weight percent of the reinforced base portion.

7. The sealing element of claim 1 wherein the resilient material of the sealing portion and base are formed of the same elastomer.

8. The sealing element of claim 1 wherein the large bulk of the discrete reinforcing fibers are oriented substantially in the same direction.

9. A sealing element comprising:
   a cylindrical body defined by an axis and having a sealing portion and a reinforced base portion;
   said sealing portion comprising an annular sealing lip formed of resilient material of relatively low stiffness and substantially free of reinforcing fibers;
   said reinforced base portion being chemically bonded to the sealing portion and comprising a resilient material in which is embedded discrete reinforcing fibers interspersed through the resilient material to form a composite, the bulk of the fibers in at least a portion of the base portion being oriented substantially in the same direction, the orientation being generally perpendicular to the axis of the element, the fibers having an aspect ratio in the range from about 10 to about 1, and the composite having a relatively high stiffness compared to the sealing lip.

10. The sealing element of claim 9 in the form of a piston rubber, wherein the oriented fibers lie substantially concentrically with respect to the axis of the cylindrical body, and a portion of such concentrically oriented fibers are positioned substantially at the outside diameter of the cylindrical body and extend circumferentially thereof.

11. The sealing element of claim 9 wherein the resilient material of the sealing portion and base are formed of the same elastomer.

12. The sealing element of claim 9 wherein the reinforced base portion is free of fabric reinforcement.

13. The sealing element of claim 12 wherein the discrete reinforcing fibers are glass fibers which are present in an amount from about 10 to about 20 weight percent of the reinforced base portion.

14. A cup-shaped stopple sealing element for isolating and cutting off the flow of material within a conduit, comprising:

a cylindrical body defined by an axis and having a sealing portion and a reinforced base portion;

said sealing portion comprising an annular sealing lip formed of resilient material of relatively low stiffness and substantially free of reinforcing fibers;

said reinforced base portion being chemically bonded to the sealing portion and comprising a resilient material in which is embedded discrete reinforcing fibers interspersed through the resilient material to form a composite, the bulk of the fibers in at least a portion of the base portion being oriented substantially in the same direction, the fibers having an aspect ratio in the range from about 10 to about 1, and the composite having a relatively high stiffness compared to the sealing lip;

said annular sealing lip protruding generally perpendicularly from the base portion;

said base portion being formed of at least two adjacent layers, the fibers in a given layer being oriented in substantially the same direction, and fibers in adjacent layers being oriented from about 30 to about 90 degrees relatively to one another.

15. A sealing element comprising:

a cylindrical body defined by an axis and having a sealing portion and a reinforced base portion;

said sealing portion comprising an annular sealing lip formed of resilient material of relatively low stiffness;

said reinforced base portion being chemically bonded to the sealing portion and formed predominantly of a resilient material in which is embedded discrete reinforcing fibers interspersed through the resilient material to form a composite, a substantial portion of the fibers being oriented substantially in the same direction, the orientation being generally perpendicular to the axis of the element, the composite having a relatively high stiffness compared to the sealing lip;

said base portion being formed of at least two adjacent layers, the fibers in a given layer being oriented in substantially the same direction, and fibers in adjacent layers being oriented from about 30 to 90 degrees relative to one another.

* * * * *